United States Patent [19]

George

[11] Patent Number: 4,895,047
[45] Date of Patent: Jan. 23, 1990

[54] VIBRATION DAMPER
[75] Inventor: Larry T. George, Greenfield, Ind.
[73] Assignee: Household Manufacturing, Inc., Prospect Heights, Ill.
[21] Appl. No.: 177,069
[22] Filed: Apr. 4, 1988
[51] Int. Cl.4 .......................... F16F 15/10; F16F 15/22
[52] U.S. Cl. ..................................... 74/574; 74/573 F
[58] Field of Search ...................... 74/574, 573 F, 573; 188/380, 378, 268, 379; 464/24, 87, 89

[56] References Cited

U.S. PATENT DOCUMENTS

| | | | |
|---|---|---|---|
| 1,218,689 | 3/1917 | Nichols | 74/573 |
| 2,957,366 | 10/1960 | Driver et al. | 74/573 |
| 2,958,165 | 11/1960 | Hofmann | 74/573 X |
| 3,078,737 | 2/1963 | McGavern | 188/268 X |
| 3,200,485 | 8/1965 | McGavern, Jr. | 74/574 X |
| 3,410,369 | 11/1968 | Ishizuka | 74/574 X |
| 3,736,811 | 6/1973 | Neary | 74/573 |
| 4,064,977 | 12/1977 | Taylor | 188/268 X |
| 4,295,546 | 10/1981 | Vollet | 188/322.5 |
| 4,341,130 | 7/1982 | Shepherd et al. | 74/574 |

FOREIGN PATENT DOCUMENTS

| | | | |
|---|---|---|---|
| 2250890 | 4/1974 | Fed. Rep. of Germany | 74/574 |
| 57226 | 7/1969 | German Democratic Rep. | 74/573 |

Primary Examiner—Rodney M. Lindsey
Attorney, Agent, or Firm—Woodard, Emhardt, Naughton, Moriarty & McNett

[57] ABSTRACT

A vibration damper having a hub including inner and outer sidewalls and a bottom wall defining an annular cavity, an inertia ring received within the annular cavity, first and second elastomeric components received between and secured to the inertia ring and the inner and outer sidewalls, respectively, of the hub, a fluid seal received between the inertia ring and the outer sidewall, and viscous damping fluid received between the inertia ring and the bottom wall, the outer sidewall being angled axially-inward in the direction away from the bottom wall. A method for production of a vibration damper is also disclosed.

6 Claims, 1 Drawing Sheet

VIBRATION DAMPER

BACKGROUND OF THE INVENTION

1. Field of the Invention

The present invention relates to the field of torsional vibration dampers, and particularly to vibration dampers adapted to be mounted on rotary shafts such as the crankshaft of an internal combustion engine.

2. Description of the Prior Art

Dampers of this type are employed to reduce torsional vibrations, and find extensive use in the automotive and diesel engine industry. Torsional vibrations are delivered intermittently to the crankshaft, and the angular vibrations may be of considerable magnitude, possibly resulting in gear damage and fatigue failure of the crankshaft.

The purpose of a torsional vibration damper is to reduce the amplitude of the vibrations. Vibration dampers convert the vibrational energy to thermal energy in the damping action. The absorption of the vibrational energy lowers the strength requirements of the shaft, and therefore lowers the required weight of the shaft. The damper also has a direct effect on inhibiting vibration of various other components of the internal combustion engine which would be affected by the crankshaft vibration.

A common form of prior art dampers includes a hub attached to the crankshaft to rotate therewith. The periphery of the hub may carry an elastomer member which in turn is coupled to an outermost, inertia member. During the engine operation, the torsional damper serves to lessen the magnitude of the angular vibrations of the crankshaft to which it is attached. Torsional vibration dampers are also known which employ a liquid of high viscosity. Such an arrangement is afforded by a hub member which carries a closed, annular cavity therein, the annular cavity being filled with a liquid of high viscosity and with an annular inertia member. The only coupling between the inertia member and the hub, the latter being connected to the crankshaft, is the viscous liquid. The prior art also includes dampers which employ both viscous and elastomer components.

Several patents show vibration dampers including both an elastomer and a viscous fluid. In U.S. Pat. No. 3,200,485, issued to McGavern on Aug. 17, 1965, there is disclosed a damper having a hub defining an annular cavity and an inertia member secured therein. An elastomer couples the hub with the radially inner and outer walls of the cavity, and a viscous fluid is received between the inertia member and the bottom wall of the cavity. In U.S. Pat. No. 3,495,459, issued to McLean on Feb. 17, 1970, there is disclosed a tuned viscous damper having an annular inertia mass received within a housing. Elastic "tuning springs" are connected to the housing by a viscous damping fluid.

A vibration damper is disclosed in U.S. Pat. No. 3,992,963, issued to Nov. 23 1976, which includes a first inertia member coupled to a hub by an elastomer, and a second inertia member within an annular cavity in the hub and surrounded by a high viscous liquid. A vibration damper including a hub with elastomeric members sandwiched between the hub and an inertia ring, and further including a viscous shear fluid in an annular, internal cavity in the hub, is described in U.S. Pat. No. 4,339,963, issued to Bremer on July 20, 1982.

A viscous torsional vibration damper is disclosed in U.S. Pat. No. 3,555,926, issued to Moorhouse et al. on Jan. 19, 1971. The damper includes an annular housing and an inertia ring received in the housing, with a viscous damping fluid therebetween. A similar viscous fluid damper is shown in U.S. Pat. No. 3,640,149, issued to McLean on Feb. 8, 1972. Elastomer dampers, having an elastomer located between and coupling a hub member and an inertia ring, are disclosed in U.S. Pat. Nos. 4,318,309, issued to Bremer on Mar. 8, 1982; 3,410,369, issued to Ishizuka on Nov. 12 1968; and, 4,341,130, issued to Shepherd et al. on July 27, 1982.

SUMMARY OF THE INVENTION

Briefly describing one aspect of the present invention. there is disclosed a vibration damper which includes a hub having an annular cavity defined by inner and outer sidewalls and a bottom wall, an inertia ring received within the annular cavity, first and second elastomeric components received between and secured to the inertia ring and the inner and outer sidewalls, respectively and viscous damping fluid received between the inertia ring and the bottom wall of the annular cavity of the hub. The outer sidewall of the hub is angled axially-inward in the direction away from the bottom wall. In the method of the present invention, the inertia ring is positioned against the bottom wall and the inner and outer elastomeric components are put in place, and the viscous damping fluid is then injected between the inertia ring and the bottom wall, thereby forcing the inertia ring away from the bottom wall with the damping fluid filling the space thus formed.

It is an object of the present invention to provide a vibration damper which is simple and inexpensive to construct. and which provides superior operating characteristics.

It is a further object of the present invention to provide a vibration damper which is easy to assemble and which permits the injection of damping fluid without the need to vent air from the space being occupied by the fluid.

Another object of the present invention is to provide a damper which avoids entrapment of air in the space between the inertia ring and surrounding annular cavity.

It is a further object of the present invention to provide a vibration damper in which precise volume filling with the damping fluid is accomplished.

Further objects and advantages to the present invention will be apparent from the description of the preferred embodiment which follows.

Figure 1:
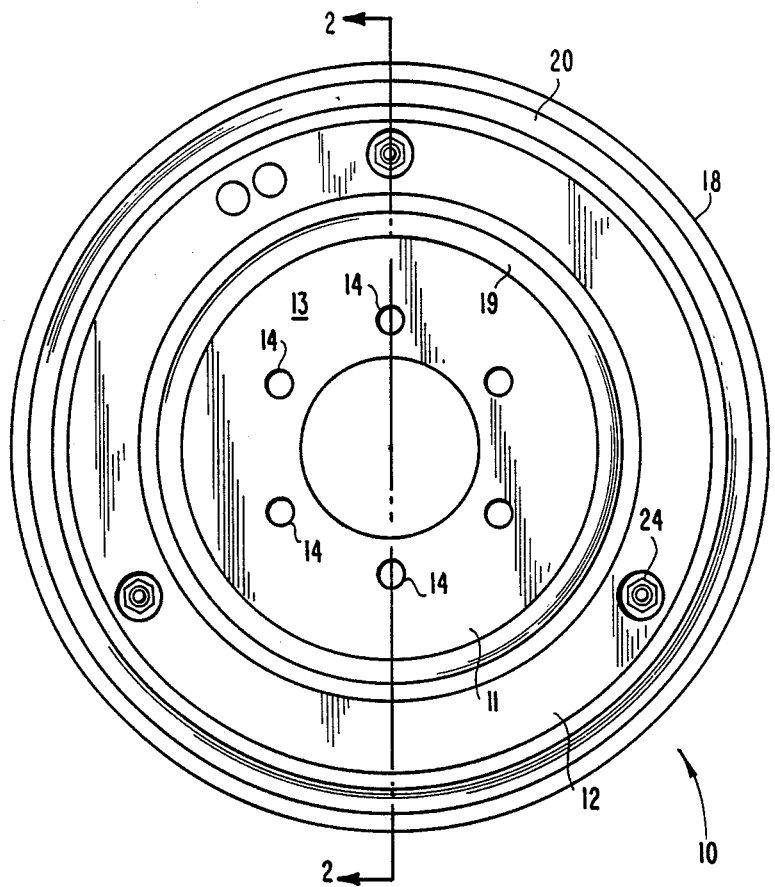
FIG. 1 is a top, plan view of a vibration damper constructed in accordance with the present invention.

The present invention provides a vibration damper adapted for mounting to a rotating shaft, and having superior operating characteristics. The damper 10 includes a hub 11 and an inertia ring 12 received within an annular cavity of the hub. The hub 11 includes a central, disc-shaped portion 13 having several mounting holes 14.

The hub includes an axially-facing, annular cavity 15 defined as follows. The hub includes a first, radially-inner sidewall 16 extending generally perpendicular to the disc-shaped center section 13. Extending outwardly from this first sidewall 16 is an annular, connecting bottom wall 17. A second, radially-outer sidewall 18 extends from the outer periphery of the bottom wall 17. The inner and outer sidewalls 16 and 18, in combination with the bottom wall 17, therefore define the annular cavity within which is received the inertia ring 12.

The inertia ring is secured to the hub by a pair of elastomeric components. The first, inner elastomeric component 19 is located between and secured to each of the radially-inner sidewall 16 and the inertia ring. The second, outer elastomeric component 20 is located between and secured to each of the radially-outer sidewall 18 and the inertia ring.

Viscous damping fluid 22 is received between the inertia ring 12 and the bottom wall 17. Various damping fluids, typically silicon materials, are known in the art as being useful in this type of application. These fluids generally have high viscosity with good stability and integrity at high temperatures.

Figure 2:
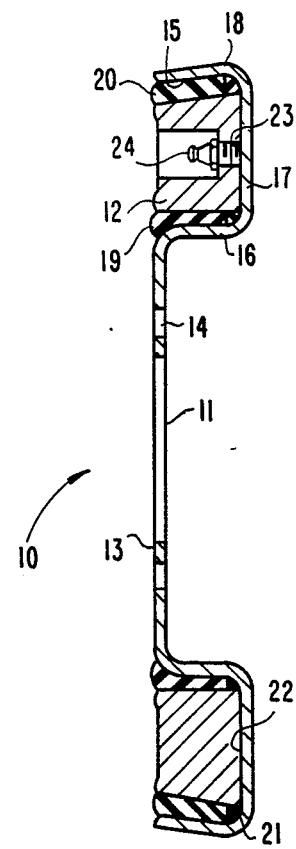
FIG. 2 is a side, cross-sectional view of the damper of FIG. 1, taken along the line 2—2 and looking in the direction of the arrows.
Figure 3:
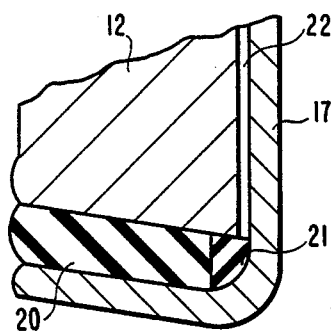
FIG. 3 is a sectional view of the lower end of the damper as viewed in FIG. 2. cl DESCRIPTION OF THE PREFERRED EMBODIMENT For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The outer sidewall 18 is preferably angled axially-inward in the direction away from the bottom wall, as shown in FIG. 2. Upon rotation of the damper, the viscous damping fluid 22 is forced outwardly. It has been found that angling the outer sidewall prevents the fluid from leaking from the damper between the outer elastomeric component 20 and either the inertia ring or the outer sidewall of the hub. It appears that in the absence of the angling of the wall, the damping fluid moves outwardly, drawing air into the annular cavity under the inertia ring. However, the angled wall, which may be in the order of an 8° angle. Apparently forces the inertia ring down toward the bottom wall, preventing significant movement of the damping fluid. The radially-outer wall being angled axially-inward in the direction away from the bottom wall thus inhibits movement of viscous damping fluid away from the bottom wall during rotation of the damper. This design therefore avoids a problem associated with certain prior art devices.

A fluid seal 21 may also be provided between the inertia ring and the outer sidewall in the area adjacent the bottom wall. A variety of materials, such as silicone rubber, may be used for the seal. Materials which swell upon contact with the viscous damping fluid are desirable to enhance the sealing effect.

As shown in the drawings, the inertia ring 12 may include one or more fill holes 23 communicating with the location between the inertia ring and the bottom wall of the annular cavity at which the viscous damping fluid is received. In the typical arrangement, a plurality of fill holes may be provided. For example, three fill holes spaced equi-radially about the inertia ring may be used.

A check valve 24 may be mounted with the fill hole to permit fluid to be injected through the fill hole, while preventing escape of fluid through the same hole. This check valve may, for example, be of the type used with standard hydraulic fittings. Alternatively, plugs (not shown) may be used to plug the fill holes after use. A typical grease gun may then be used to inject viscous damping fluid through the fill hole, with a plug thereafter being threaded into the fill hole to retain the fluid in place.

In accordance with the method of the present invention, a vibration damper is produced in the following manner. The inertia ring 12 is place within the annular cavity of the hub 11. The first and second elastomeric components are positioned between the inertia ring and the inner and outer sidewalls, respectively. If used the fluid seal 21 is also positioned as shown in the drawings. Either before or after filling, but preferably before filling, with the viscous damping fluid, the elastomeric components are bonded to the respective surfaces of the hub and inertia ring. The elastomeric components may be any of a variety of suitable materials, such as an ethylene acrylic rubber, as commonly used in vibration dampers. The bonding may be accomplished for example by heat curing. A suitable adhesive may be coated onto the elastomeric components prior to insertion into the assembly to effectuate the bond.

At the time of bonding, the inertia ring is clamped in the annular cavity directly in contact with the bottom wall, substantially evacuating any air which would otherwise be present between the ring and bottom wall. Similarly, the elastomeric components and seal are forced down into the cavity to expel as much air as possible from the space between the inertia ring and the cavity walls.

The damping fluid 22 is injected between the inertia ring and the bottom wall 17. This injecting occurs through the fill holes 23, and may include injection of the fluid through a check valve 24 mounted to the fill hole. As indicated, the method contemplates that the inertia ring is held against the bottom wall while bonding of the elastomeric components takes place. The viscous damping fluid is then injected under pressure through the fill holes 23, forcing the inertia ring away from the bottom wall and filling the space thereby created. The inertia ring 12, seal 21 and elastomeric components 19 and 20 are forced into the cavity prior to bonding to expel air that would otherwise be present. The injection of fluid therefore is accomplished with a minimum of air being present in the annular cavity. This obviates the need in prior art devices to evacuate air as the fluid is injected. This also provides for a more precise volume filling, and more reliable spacing of the inertia ring from the bottom wall.

As indicated, the injection of the damping fluid is preferably performed after bonding of the elastomeric components to the inertia ring and inner and outer sidewalls. The addition of the fluid therefore forces the inertia ring away from the hub, and against the resistance of the elastomeric components bonded to both the inertia ring and hub.

The vibration damper of the present invention provides a superior design that has particularly desirable damping characteristics. The design includes both elastomeric and damping fluid components, thus enabling two different media to be adjusted to yield the desired characteristics. The geometries and material properties for these components may be varied to suit a given application. At the same time, the damper has a moderate manufacturing cost. In typical prior art devices, a damper might include a cup which is machined and then has a cover plate welded thereto, with filling being accomplished through a filling hole while another hole is used to vent the air. In contrast, the present design may utilize a stamped hub, and assembly of the other components to the hub is straightforward. Also, the damper design of the present invention provides an efficient heat path to the outside, away from the elastomeric components and damping fluid to enhance dissipation of the heat generated.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vibration damper which comprises:

a hub adapted to be coupled to a rotating shaft subject to torsional vibrations, said hub including a first, radially-inner sidewall, a second, radially-outer sidewall, and an annular, bottom wall connecting between the first and second sidewalls, the first and second sidewalls and the bottom wall together defining an annular cavity;

an annular inertia ring received within the cavity of said hub;

a first, inner elastomeric component located between and secured to each of the radially-inner sidewall and said inertia ring;

a second, outer elastomeric component located between and secured to each of the radially-outer sidewall and said inertia ring; and a viscous damping fluid between the bottom wall and said inertia ring, said radially-outer wall being angled axially-inward in the direction away from the bottom wall to inhibit movement of viscous damping fluid away from the bottom wall during rotation of the damper.

2. The vibration damper of claim 1 in which said inertia ring includes at least one fill hole extending through said inertia ring and in communication with the location of said viscous damping fluid.

3. The vibration damper of claim 2 in which said inertia ring includes a plurality of fill holes extending through said inertia ring and in communication with the location of said viscous damping fluid.

4. The vibration damper of claim 2 and further including plug means for plugging said at least one fill hole to retain the viscous fluid between said inertia ring and the bottom wall of said hub.

5. The vibration damper of claim 2 and further including a check valve means mounted within said at least one fill hole and being for permitting injection of viscous damping fluid through the fill hole and retaining viscous damping fluid between said inertia ring and the bottom wall of said hub.

6. The vibration damper of claim 1 and which further includes a fluid seal positioned between said inertia ring and the radially-outer sidewall adjacent the bottom wall of said hub.

* * * * *